(12) United States Patent
Fujimura et al.

(10) Patent No.: US 8,556,583 B2
(45) Date of Patent: Oct. 15, 2013

(54) BLADE COOLING STRUCTURE OF GAS TURBINE

(75) Inventors: Daigo Fujimura, Takasago (JP);
Hideaki Sugishita, Takasago (JP);
Masaaki Matsuura, Takasago (JP);
Hiroyuki Yamamoto, Takasago (JP);
Shunsuke Torii, Takasago (JP); Satoshi Hada, Takasago (JP); Kiyoshi Suenaga, Kakogawa (JP); Yuko Suenaga, Kakogawa (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 489 days.

(21) Appl. No.: 12/670,912

(22) PCT Filed: Aug. 30, 2007

(86) PCT No.: PCT/JP2007/066881
§ 371 (c)(1),
(2), (4) Date: May 6, 2010

(87) PCT Pub. No.: WO2009/028067
PCT Pub. Date: Mar. 5, 2009

(65) Prior Publication Data
US 2010/0226791 A1 Sep. 9, 2010

(51) Int. Cl.
*B64C 11/24* (2006.01)
(52) U.S. Cl.
USPC .......................................... 416/92; 416/97 R
(58) Field of Classification Search
USPC ........ 415/115, 116; 416/90 R, 92, 96 R, 97 R
See application file for complete search history.

(56) References Cited

U.S. PATENT DOCUMENTS 5,738,493 A * 4/1998 Lee et al. ..................... 416/97 R
5,975,850 A * 11/1999 Abuaf et al. ................ 416/97 R (Continued)

FOREIGN PATENT DOCUMENTS

| JP | 6-101405 A | 4/1994 |
| JP | 7-293203 A | 11/1995 |

(Continued)

OTHER PUBLICATIONS

Todd S. Griffith et al, "Heat Transfer in Rotating Rectangular Cooling Channels (AR=4) With Dimples", Journal of Turbomachinery, Jul. 2003, pp. 555-564, vol. 125.

(Continued)

*Primary Examiner* — Edward Look
*Assistant Examiner* — Christopher J Hargitt
(74) *Attorney, Agent, or Firm* — Westerman, Hattori, Daniels & Adrian, LLP

(57) ABSTRACT

A blade cooling structure of a gas turbine, which can reduce the pressure loss of a cooling medium without decreasing the heat transfer coefficient, is provided. The blade cooling structure comprises a cooling passage (15) for flowing cooling air (A) from a proximal end portion (12) toward a blade portion (14) of a moving blade (11), a plurality of turbulators (21) arranged, on both wall surfaces of the cooling passage (15) opposing each other, in such a manner as to be inclined with respect to the flowing direction of the cooling air (A), and a plurality of dimples (22) formed in a downstream region (N) downstream of a center position (O) in the flowing direction of the cooling air (A) on the wall surface of the cooling passage (15) between the adjacent turbulators (21).

1 Claim, 5 Drawing Sheets

(56) References Cited

U.S. PATENT DOCUMENTS

| | | | |
|---|---|---|---|
| 6,290,462 B1 * | 9/2001 | Ishiguro et al. | 416/97 R |
| 7,186,084 B2 * | 3/2007 | Bunker et al. | 416/96 R |
| 2003/0228221 A1 | 12/2003 | Bunker et al. | |
| 2005/0106021 A1 | 5/2005 | Bunker et al. | |

FOREIGN PATENT DOCUMENTS

| | | |
|---|---|---|
| JP | 8-296403 A | 11/1996 |
| JP | 9-195703 A | 7/1997 |
| JP | 10-325301 A | 12/1998 |
| JP | 11-173105 A | 6/1999 |
| JP | 2004-028097 A | 1/2004 |
| JP | 2004-137958 A | 5/2004 |
| JP | 2005-147132 A | 6/2005 |
| WO | 2004/035992 A1 | 4/2004 |

OTHER PUBLICATIONS

International Search Report of PCT/JP2007/066881, mailing date of Oct. 30, 2007.

Extended European Search Report dated Nov. 20, 2012, issued in corresponding European Patent Application No. 07806358.3, (6 pages).

\* cited by examiner

BLADE COOLING STRUCTURE OF GAS TURBINE

TECHNICAL FIELD

This invention relates to a blade cooling structure of a gas turbine.

BACKGROUND ART

Many gas turbines are used for various applications ranging from those for general industries, such as electric power generation, to those for aircraft such as helicopters. In the gas turbine, power is generally obtained by jetting fuel at air, which has been compressed at a high temperature by a compressor, within a combustion cylinder to burn the fuel, thereby producing a combustion gas, straightening the combustion gas by stationary blades, and guiding it to moving blades, thereby rotating a turbine. In recent years, a high output and a high efficiency have been demanded of the gas turbine, and the temperature of the combustion gas guided to the stationary blades and the moving blades has tended to become higher.

However, the heat-resistant performance of the respective members exposed to the combustion gas, including the stationary blades and the moving blades, is restricted by the characteristics of their materials. Thus, if it is attempted to achieve the high output and high efficiency simply by raising the temperature of the combustion gas, a decrease in strength may be caused to the respective members such as the stationary blades and the moving blades. Under these circumstances, it has been customary practice to provide a cooling passage, intended for flowing a cooling medium such as air or steam, in the interior of each of the stationary blades and the moving blades. By so doing, it has been attempted to ensure heat resistance while cooling the stationary blades and the moving blades, and achieve the high temperature of the combustion gas, thereby increasing the output and the efficiency.

Turbulators for increasing the heat transfer coefficient are provided in the above cooling passage. These turbulators are arranged in multiple stages obliquely at a predetermined angle with respect to the extending direction of the cooling passage, that is, arranged to cross the flowing direction of the cooling medium, thereby causing turbulence to the cooling medium flowing into the cooling passage, and also forming secondary flows running along the turbulators. By this action of the turbulators, the amount of heat exchange with the wall surface of the cooling passage is increased to increase the heat transfer coefficient and perform the cooling of the blades efficiently.

Such a conventional blade cooling structure of the gas turbine is disclosed, for example, in Patent Document 1.
Patent Document 1: JP-A-2005-147132

DISCLOSURE OF THE INVENTION

Problems to be Solved by the Invention

With the conventional blade cooling structure of the gas turbine, there is a possibility for a pressure loss of the cooling medium because of pins or dimples, in addition to the turbulators, are provided in the cooling passage with the aim of further increasing the heat transfer coefficient. In other words, with the conventional structure, heat transfer is enhanced by providing the pins or dimples, without any measures taken against the pressure loss of the cooling medium. Since the pressure loss of the cooling medium is increased by their provision, the cooling performance for the blades may decline.

In providing the blade cooling structure of the gas turbine, which is equipped with the turbulators, therefore, corrective measures have to be taken for realizing the contradictory actions, namely, an increase in the heat transfer coefficient and a decrease in the pressure loss. It is considered necessary to optimize the arrangement of the cooling elements, such as the turbulators and dimples, in consideration of both actions mentioned above.

The present invention has been accomplished as a solution to the above-described problems. It is an object of the present invention to provide a blade cooling structure of a gas turbine which can reduce the pressure loss of a cooling medium without decreasing the heat transfer coefficient.

Means for Solving the Problems

A blade cooling structure of a gas turbine, according to a first aspect of the invention for solving the above problems, comprises:
a cooling passage for flowing a cooling medium from a proximal end toward a leading end of a blade;
a plurality of turbulators arranged, on both wall surfaces of the cooling passage opposing each other, in such a manner as to be inclined with respect to a flowing direction of a cooling medium; and
a plurality of dimples formed in a region downstream of a position spaced, nearly two-fifths of a length of the wall surface of the cooling passage between the adjacent turbulators, away from an upstream side in the flowing direction of the cooling medium.

A blade cooling structure of a gas turbine, according to a second aspect of the invention for solving the above problems, is the blade cooling structure of a gas turbine according to the first aspect, wherein
the dimples are formed in a flowing region of secondary flows occurring when the cooling medium collides with the turbulator.

Effects of the Invention

A blade cooling structure of a gas turbine, according to a first aspect of the invention, comprises: a cooling passage for flowing a cooling medium from a proximal end toward a leading end of a blade; a plurality of turbulators arranged, on both wall surfaces of the cooling passage opposing each other, in such a manner as to be inclined with respect to a flowing direction of a cooling medium; and a plurality of dimples formed in a region downstream of a position spaced, nearly two-fifths of a length of the wall surface of the cooling passage between the adjacent turbulators, away from an upstream side in the flowing direction of the cooling medium. Thus, it becomes possible to reduce the pressure loss of the cooling medium without decreasing the heat transfer coefficient.

A blade cooling structure of a gas turbine, according to a second aspect of the invention, is the blade cooling structure of a gas turbine according to the first aspect, wherein the dimples are formed in a flowing region of secondary flows occurring when the cooling medium collides with the turbulator. Thus, a vortex can be easily caused to the secondary flows.

DESCRIPTION OF THE NUMERALS AND SYMBOLS 11 moving blade, 12 proximal end portion, 13 rest, 14 blade portion, 15 cooling passage, 18 dorsal wall portion, 19 ventral wall portion, 20 partition wall, 21 turbulator, 22 dimple, G combustion gas, A cooling air, a secondary flow, a angle, P pitch, e amount of protrusion, W width, H height, O center position, M upstream region, N downstream region

BEST MODE FOR CARRYING OUT THE INVENTION

Figure 1:
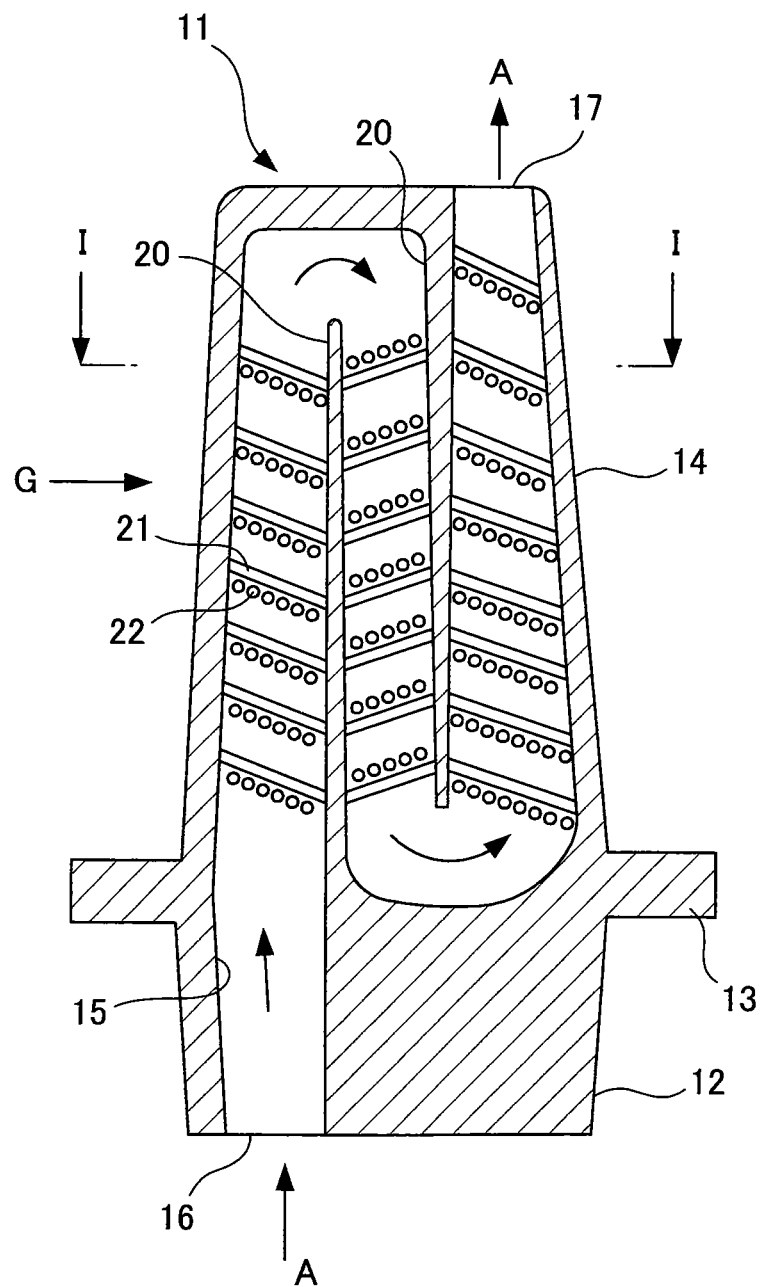
FIG. 1 is a longitudinal sectional view of a gas turbine moving blade equipped with a blade cooling structure of a gas turbine according to an embodiment of the present invention.
Figure 2:
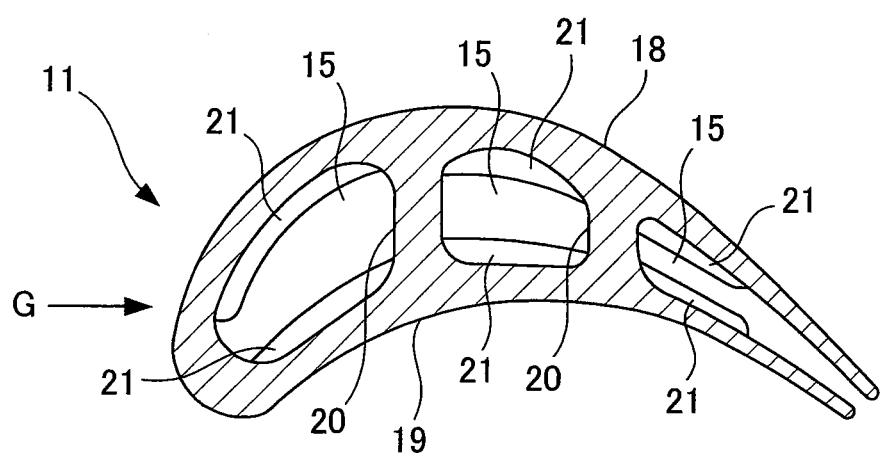
FIG. 2 is a sectional view taken in the direction of arrows along line I-I in FIG. 1.
Figure 3:
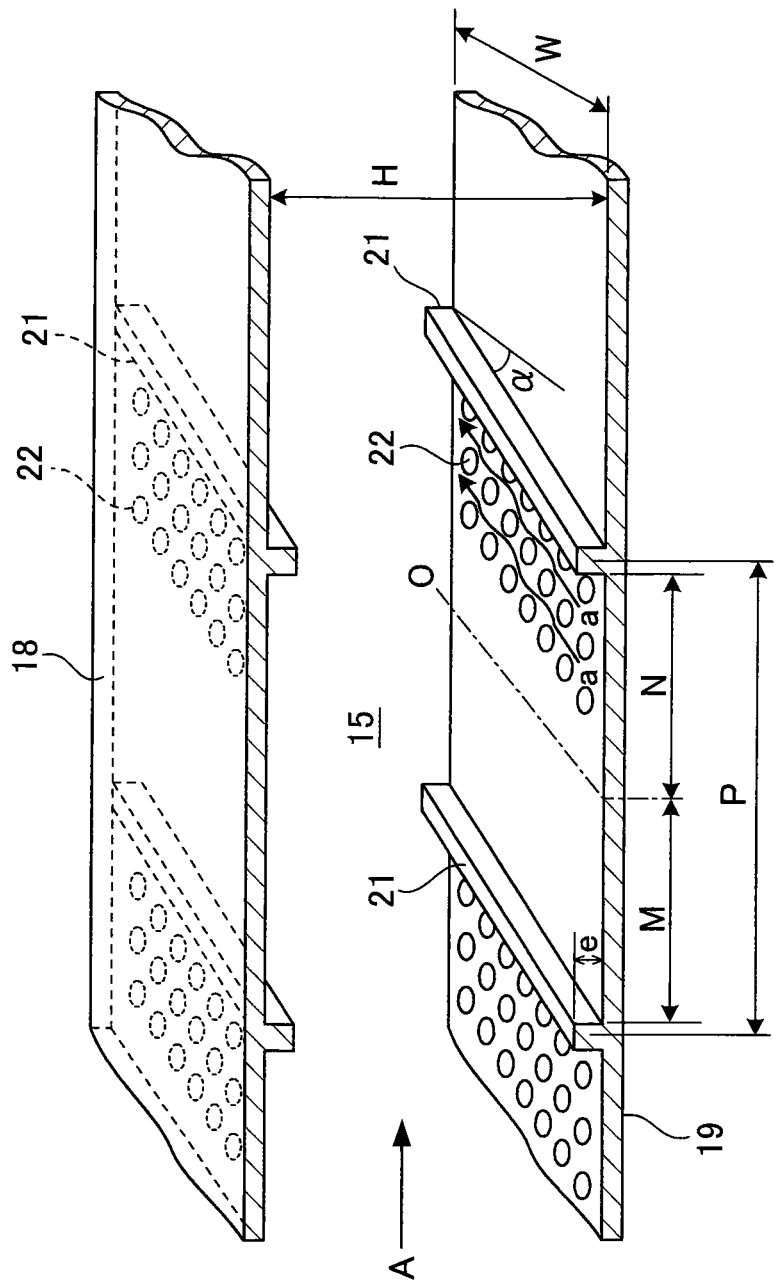
FIG. 3 is a schematic view of a cooling passage.
Figures 4A, 4B, 4C:
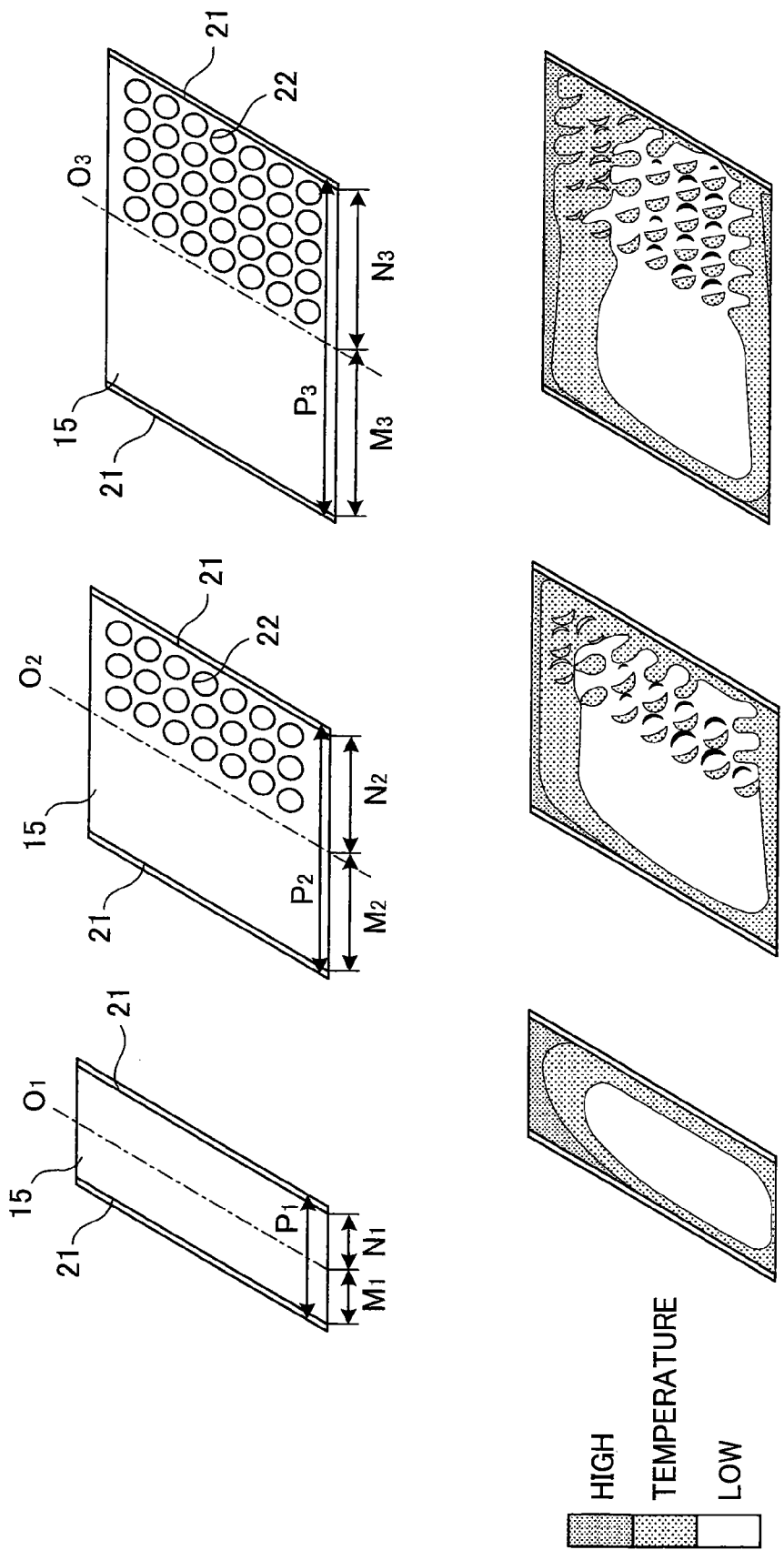
FIG. 4(a) is a schematic view of a structure as a basis for the blade cooling structure of the gas turbine according to the embodiment of the present invention, and a schematic view showing the temperature distribution of this basic structure during cooling.
FIG. 4(b) is a schematic view of the blade cooling structure of the gas turbine according to the embodiment of the present invention, and a schematic view showing the temperature distribution of this structure during cooling.
FIG. 4(c) is a schematic view of the blade cooling structure of the gas turbine according to another embodiment of the present invention, and a schematic view showing the temperature distribution of this structure during cooling.
Figure 5:
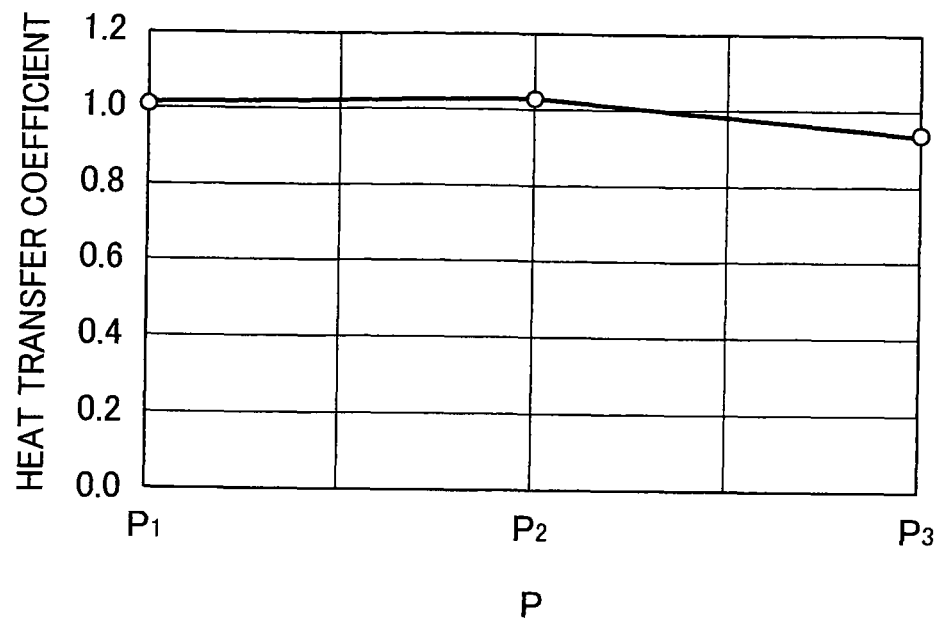
FIG. 5 is a graph showing the heat transfer coefficients of the respective structures in FIGS. 4(a) to 4(c).
Figure 6:
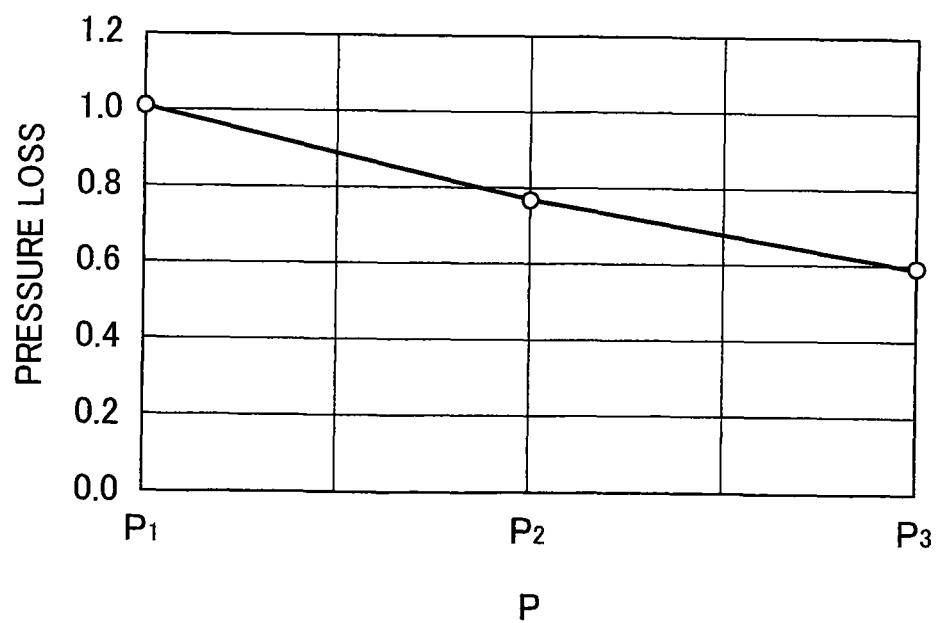
FIG. 6 is a graph showing the pressure losses of the respective structures in FIGS. 4(a) to 4(c).

The blade cooling structure of a gas turbine according to the present invention will be described in detail based on the accompanying drawings. FIG. 1 is a longitudinal sectional view of a gas turbine moving blade equipped with a blade cooling structure of a gas turbine according to an embodiment of the present invention. FIG. 2 is a sectional view taken in the direction of arrows along line I-I in FIG. 1. FIG. 3 is a schematic view of a cooling passage. FIG. 4(a) is a schematic view of a structure as a basis for the blade cooling structure of the gas turbine according to the embodiment of the present invention, and a schematic view showing the temperature distribution of this basic structure during cooling. FIG. 4(b) is a schematic view of the blade cooling structure of the gas turbine according to the embodiment of the present invention, and a schematic view showing the temperature distribution of this structure during cooling. FIG. 4(c) is a schematic view of the blade cooling structure of the gas turbine according to another embodiment of the present invention, and a schematic view showing the temperature distribution of this structure during cooling. FIG. 5 is a graph showing the heat transfer coefficients of the respective structures in FIGS. 4(a) to 4(c). FIG. 6 is a graph showing the pressure losses of the respective structures in FIGS. 4(a) to 4(c).

A moving blade 11 shown in FIGS. 1 to 3 is supported by a rotor rotatably provided in a gas turbine (not shown). A combustion gas G at a high temperature and a high pressure, introduced into a turbine from a combustor, is supplied from the front edge side, whereby the moving blade 11 is rotated about the rotor.

The moving blade 11 is composed of a proximal end portion 12 supported by the rotor, and a blade portion 14 formed integrally with the proximal end portion 12 via a rest 13. The interior of the moving blade 11 is provided with a cooling passage 15 which extends to range from the proximal end portion 12 to the blade portion 14 and consists of three passages communicating with each other.

The cooling passage 15 has an inlet 16 communicating with a fluid passage (not shown) formed within the rotor and supplying cooling air A, and an outlet 17 opening at the leading end of the blade portion 14. The entire length of the cooling passage 15 is formed by a dorsal wall portion 18, a ventral wall portion 19, and a partition wall 20 constituting the blade portion 14. The length in the width direction of the cooling passage 15 is formed to be W, and the length in the height direction of the cooling passage 15 is formed to be H.

On both wall surfaces in the dorsal wall portion 18 and the ventral wall portion 19 of the cooling passage 15, a plurality of turbulators 21 are provided in multiple stages with equal pitch P in the extending direction of the cooling passage 15 (in the flowing direction of cooling air A). This turbulator 21 protrudes in a predetermined amount of protrusion (height), e, from the wall surface of the cooling passage 15, and extends over the entire region of the width W of the cooling passage 15 while forming a predetermined angle α with respect to the extending direction of the cooling passage 15. This means that the turbulator 21 is provided to cross the flowing direction of the cooling air A.

A plurality of circular dimples 22 are provided on the wall surface of the cooling passage 15. These dimples 22 are formed in a region N downstream of a center position O in the flowing direction (extending direction of the cooling passage 15) on the wall surface of the cooling passage 15 between the adjacent turbulators 21, i.e., the center position O of the pitch P, (this region N will hereinafter be referred to as the downstream region N). A region upstream of the center position O will be designated as M (this region will hereinafter be referred to as the upstream region M).

By imparting the above-mentioned features, therefore, the cooling air A introduced from the fluid passage within the rotor into the inlet 16 of the cooling passage 15 flows toward the blade portion 14, turns near the leading end of the blade portion 14, and flows toward the proximal end portion 12. Then, the cooling air A turns again near the rest 13, flows toward the blade portion 14, and exits from the outlet 17. Then, the cooling air A merges with the combustion gas G flowing along the outer peripheral edge of the moving blade 11. As seen here, the cooling air A flows through the cooling passage 15, whereby it exchanges heat with the wall surface of the cooling surface 15 to cool the moving blade 11.

When the cooling air A flows through the cooling passage 15, as described above, the cooling air A collides with each of the turbulators 21. Upon collision of the cooling air A with the turbulator 21, a vortex (vortical flow) appears on the downstream side of the turbulator 21, while secondary flows a flowing so as to run along the extending direction of the turbulator 21 are formed between the turbulators 21. That is, the secondary flow a streams, in such a manner as to cross the flowing direction of the cooling air A, on the downstream side of the region where the vortex of the cooling air A occurs. The secondary flow a streams at a lower flow rate than the flow rate of a flow of the cooling air A which is a main stream, and runs at a low flow velocity. This secondary flow a runs over the dimples 22, so that a vortex is formed by the depressions of the dimples 22, thereby disturbing the secondary flow a as well. As a result, the amount of heat exchange with the wall surface of the cooling passage 15 is increased, whereby the heat transfer coefficients of the cooling air A flowing through the cooling passage 15 and the secondary flow a are increased.

Next, the heat transfer coefficient and pressure loss in the above-described blade cooling structure of a gas turbine according to the present invention will be explained using FIGS. 4(a) to 4(c) through FIG. 6. Concretely, the structures in which the length of the pitch P is changed stepwise ($P_1 < P_2 < P_3$), and the angle α, the width W and height H of the cooling passage 15, and the amount of protrusion e of the turbulator 21 are rendered constant, are provided as shown in FIGS. 4(a) to 4(c). The heat transfer coefficient and pressure loss in each of these structures are indicated, as shown in FIGS. 5 and 6, for comparative investigation.

The structure shown in FIG. 4(a) has the turbulators 21 provided in multiple stages with equal pitch $P_1$ along the extending direction of the cooling passage 15. A center position $O_1$ is at the center of the pitch $P_1$, and a region upstream of this center position $O_1$ is designated as an upstream region $M_1$, while a region downstream of this center position $O_1$ is designated as a downstream region $N_1$. A look at a temperature distribution on the wall surface of the cooling passage 15 during cooling in this configuration shows a distribution of the temperature becoming gradually higher outwardly from the center position $O_1$. This means that a vortex of the cooling air A produced by the turbulator 21 appeared in the upstream region $M_1$ and developed up to the center position $O_1$.

The structure shown in FIG. 4(b) is a structure in which the turbulators 21 were provided in multiple stages with equal pitch $P_2$ along the extending direction of the cooling passage 15, and a plurality of the dimples 22 were provided in a downstream region $N_2$ downstream of a center position $O_2$ of the pitch $P_2$. The upstream side of the center position $O_2$ is designated as an upstream region $M_2$. A look at a temperature distribution on the wall surface of the cooling passage 15 during cooling in this configuration shows a distribution of the temperature becoming gradually higher from nearly the center of the upstream region $M_2$ toward the outside and also becoming gradually higher from nearly the center of the downstream region $N_2$ toward the outside. This means that a vortex of the cooling air A produced by the turbulator 21 occurred in the upstream region $M_2$, and also a vortex of secondary flows a produced by the dimples 22 occurred in the downstream region $N_2$.

The structure shown in FIG. 4(c) is a structure in which the turbulators 21 were provided in multiple stages with equal pitch $P_3$ along the extending direction of the cooling passage 15, and a plurality of the dimples 22 were provided in a downstream region $N_3$ downstream of a center position $O_3$ of the pitch $P_3$. The upstream side of the center position $O_3$ is designated as an upstream region $M_3$. A look at a temperature distribution on the wall surface of the cooling passage 15 during cooling in this configuration shows a distribution of the temperature becoming gradually higher from nearly the center of the upstream region $M_3$ toward the outside and also becoming gradually higher from nearly the center of the downstream region $N_3$ toward the outside. This means that a vortex of the cooling air A produced by the turbulator 21 occurred in the upstream region $M_3$, and also a vortex of secondary flows a produced by the dimples 22 occurred in the downstream region $N_3$.

The heat transfer coefficients in the respective structures in FIGS. 4(a) to 4(c) are shown in FIG. 5. FIG. 5 shows the average heat transfer coefficient on the surface. If the heat transfer coefficient with the structure in FIG. 4(a) is taken as a reference (=1.0), this heat transfer coefficient is found to be almost equal to the heat transfer coefficients with the structures in FIGS. 4(b) and 4(c). That is, the temperature distributions in the structures of FIGS. 4(a) to 4(b) are nearly symmetrical on the upstream side to the downstream side with respect to the center positions $O_1$, $O_2$ and $O_3$. Thus, the heat transfer coefficient is unchanged in any of the structures. Even if the pitch P is lengthened, a nearly uniform heat transfer coefficient can be obtained, because the wall surface of the cooling passage 15 between the adjacent turbulators 21 can be held at a nearly constant temperature by providing the dimples 22 in the downstream regions $N_1$, $N_2$, $N_3$ where the secondary flows a occur.

Let us ponder a case where the dimples 22 are not formed, as in the structure of FIG. 4(a). With such a structure, secondary flows a occur, but these secondary flows a stream at a lower flow rate than the flow rate of the cooling air A, which forms a main flow, and stream at a low velocity. Thus, their amount of heat exchange with the wall surface of the cooling passage 15 is so small that the heat transfer coefficient in the downstream region $N_1$ lowers. Consequently, the heat transfer coefficient on the wall surface of the cooling passage 15 between the adjacent turbulators 21 becomes nonuniform.

Next, the pressure losses of the cooling air A in the respective structures of FIGS. 4(a) to 4(c) will be investigated with reference to FIG. 6. If the pressure loss with the structure in FIG. 4(a) is taken as a reference (=1.0), it turns out that the pressure loss with the structure in FIG. 4(b) is about 0.8, and the pressure loss with the structure in FIG. 4(c) is about 0.6. That is, the longer the pitch P, the smaller the pressure loss becomes. Even if the dimples 22 are formed, these dimples 22 are formed in the downstream regions $N_2$, $N_3$ where secondary flows at a low flow rate and a low velocity occur. Thus, an increase in the pressure loss can be prevented.

According to the blade cooling structure of a gas turbine concerned with the present invention, therefore, the dimples 22 are provided in the region where the secondary flows a occur, so that a vortex can be forcibly caused to the secondary flows a. Thus, the pitch P of the turbulators 21 is lengthened, whereby the pressure loss can be reduced, without a decrease in the heat transfer coefficient.

In the present embodiment, the dimples 22 are formed downstream of the center position O on the wall surface of the cooling passage 15 between the adjacent turbulators 21. However, in consideration of the leeway of the flow region width of the secondary flows a, the dimples 22 may be formed in a region downstream of a position spaced, nearly two-fifths of the length of the wall surface of the cooling passage 15 between the adjacent turbulators 21, away from the upstream side in the flowing direction of the cooling air A. Moreover, it suffices for the dimples 22 to be located downstream of the above "two-fifths" position, and the number, location, shape and depth of the dimples 22 are not limited to those in the present embodiment. Furthermore, the number, location, shape and depth of the dimples 22 can be changed according to the flow rate and velocity of the secondary flows a, thereby setting the heat transfer coefficient at a desired value.

Besides, the blade cooling structure of a gas turbine concerned with the present invention can be applied to gas turbine stationary blades as well.

INDUSTRIAL APPLICABILITY

The present invention is applicable to a cooling apparatus intended to increase the heat transfer coefficient of a cooling medium.

The invention claimed is:
1. A blade cooling structure of a gas turbine, comprising:
a cooling passage for flowing a cooling medium from a proximal end toward a leading end of a blade;
a plurality of turbulators arranged, on both wall surfaces of the cooling passage opposing each other, in such a manner as to be inclined with respect to a flowing direction of a cooling medium; and a plurality of dimples formed in a flowing region on an upstream side between adjacent turbulators where secondary flows occur when the cooling medium collides with the turbulator on the wall surface of the cooling passage between the adjacent turbulators, the secondary flows flowing so as to run along the extending direction of the turbulator; and wherein the downstream side of said adjacent turbulators are free of said dimples.

* * * * *